US012759891B2

(12) United States Patent
Doutre et al.

(10) Patent No.: US 12,759,891 B2
(45) Date of Patent: Oct. 13, 2026

(54) OXIDATIVE ROASTING OF BLACK DROSS AND SALT CAKE

(71) Applicant: Novelis Inc., Atlanta, GA (US)

(72) Inventors: Don Allen Doutre, Kingston (CA); Gary Richard Hay, Sydenham (CA)

(73) Assignee: Novelis Inc.

(*) Notice: Subject to any disclaimer, the term of this patent is extended or adjusted under 35 U.S.C. 154(b) by 1197 days.

(21) Appl. No.: 17/596,947

(22) PCT Filed: Jun. 26, 2020

(86) PCT No.: PCT/US2020/039803
§ 371 (c)(1),
(2) Date: Dec. 22, 2021

(87) PCT Pub. No.: WO2020/264281
PCT Pub. Date: Dec. 30, 2020

(65) Prior Publication Data

US 2022/0259057 A1 Aug. 18, 2022

Related U.S. Application Data

(60) Provisional application No. 62/867,721, filed on Jun. 27, 2019.

(51) Int. Cl.
*C01D 3/04* (2006.01)
*C22B 7/04* (2006.01)
*C22B 21/00* (2006.01)

(52) U.S. Cl.
CPC .................. *C01D 3/04* (2013.01); *C22B 7/04* (2013.01); *C22B 21/0069* (2013.01)

(58) Field of Classification Search
CPC ......... C01D 3/04; C22B 7/04; C22B 21/0069; C22B 7/005; Y02P 10/20
See application file for complete search history.

(56) References Cited

U.S. PATENT DOCUMENTS 3,039,158 A 6/1962 Mueller
4,137,295 A 1/1979 Tamers
(Continued)

FOREIGN PATENT DOCUMENTS

CA 2842587 9/2018
CN 1246810 A 3/2000
(Continued)

OTHER PUBLICATIONS

CN202080046685.7, "Office Action", Nov. 30, 2023, 13 pages.
(Continued)

*Primary Examiner* — Anthony J Zimmer
*Assistant Examiner* — Syed T Iqbal
(74) *Attorney, Agent, or Firm* — Kilpatrick Townsend & Stockton LLP

(57) ABSTRACT

Salt components of dross can be extracted efficiently through evaporation. During dross treatment, temperatures can be permitted to approach or exceed the boiling point of one or more salt components of the dross, preferably in an oxidizing environment. The temperature can be held sufficiently high such that the salt content can exert an appreciable vapor pressure and can be held for a sufficient time to permit most, all, or substantially all of the salt content to evaporate and be carried away from the kiln in combustion gasses. The evaporated salt can be condensed and collected.

20 Claims, 10 Drawing Sheets

(56) References Cited

U.S. PATENT DOCUMENTS

| | | | | | |
|---|---|---|---|---|---|
| 4,523,949 | A | * | 6/1985 | Gower | C22B 21/0007 423/133 |
| 4,752,328 | A | | 6/1988 | Peterson | |
| 4,767,449 | A | | 8/1988 | Rosen et al. | |
| 4,927,459 | A | | 5/1990 | Gardner et al. | |
| 5,198,200 | A | | 3/1993 | Yerushalmi et al. | |
| 5,254,511 | A | | 10/1993 | Nadkarni et al. | |
| 5,300,136 | A | | 4/1994 | Stauffer et al. | |
| 5,330,618 | A | | 7/1994 | Daniels et al. | |
| 5,613,996 | A | | 3/1997 | Lindsay | |
| 5,783,142 | A | | 7/1998 | Lindsay | |
| 5,901,910 | A | | 5/1999 | Grosso et al. | |
| 9,382,595 | B2 | | 7/2016 | Dubé | |
| 2003/0236345 | A1 | | 12/2003 | Morii et al. | |
| 2005/0257644 | A1 | | 11/2005 | Nakai et al. | |
| 2014/0224069 | A1 | | 8/2014 | Dube | |
| 2016/0045841 | A1 | | 2/2016 | Kaplan et al. | |
| 2018/0369827 | A1 | | 12/2018 | Ahn et al. | |
| 2022/0251680 | A1 | | 8/2022 | Doutre et al. | |

FOREIGN PATENT DOCUMENTS

| | | | |
|---|---|---|---|
| CN | 1752221 | A | 3/2006 |
| CN | 101755065 | A | 6/2010 |
| CN | 104302792 | A | 1/2015 |
| CN | 106062135 | A | 10/2016 |
| CN | 106687424 | A | 5/2017 |
| CN | 107407522 | A | 11/2017 |
| DE | 212020000664 | U1 | 2/2022 |
| DE | 212020000667 | U1 | 2/2022 |
| EP | 0576254 | A2 | 12/1993 |
| FR | 3057114 | A1 | 4/2018 |
| JP | 08281239 | | 10/1996 |
| JP | 09206727 | A | 8/1997 |
| JP | 2002235122 | A | 8/2002 |
| JP | 2003138320 | A | 5/2003 |
| JP | 3200289 | B2 | 9/2015 |
| JP | 2017509716 | A | 4/2017 |
| JP | 2018178171 | A | 11/2018 |
| JP | 2022538123 | A | 8/2022 |
| JP | 2022538250 | A | 9/2022 |
| KR | 20070071889 | A | 7/2007 |
| KR | 20220012311 | A | 2/2022 |
| KR | 20220012917 | A | 2/2022 |
| RU | 2132398 | | 6/1999 |
| WO | 2015165895 | A1 | 11/2015 |
| WO | 2018088636 | A1 | 5/2018 |
| WO | 2019060996 | A1 | 4/2019 |

OTHER PUBLICATIONS

CN202080046840.5, "Office Action", Jan. 15, 2024, 6 pages.
KR10-2021-7040743, "Notice of Decision to Grant", Nov. 28, 2023, 2 pages.
KR10-2021-7041958, "Notice of Decision to Grant", Feb. 7, 2024, 2 pages.
KR10-2021-7042266, "Notice of Decision to Grant", Jan. 26, 2024, 2 pages.
CN202080046647.1, "Office Action", Jan. 11, 2024, 4 pages.
CA3,142,012 , "Office Action", May 11, 2023, 4 pages.
CA3,142,015 , "Office Action", May 12, 2023, 5 pages.
CA3,142,027 , "Office Action", May 12, 2023, 5 pages.
CN202080046647.1 , "Office Action", Feb. 24, 2023, 18 pages.
JP2021-576695 , "Office Action", Mar. 14, 2023, 6 pages.
JP2021-576698 , "Office Action", Feb. 21, 2023, 5 pages.
JP2021-576748 , "Office Action", Mar. 28, 2023, 3 pages.
BR112021024129-9, "Office Action", Oct. 22, 2024, 4 pages.
BR112021024214-7 , "Office Action", Oct. 22, 2024, 4 pages.
BR112021024238-4 , "Office Action", Oct. 22, 2024, 6 pages.
CA3,142,012 , "Office Action", Sep. 26, 2022, 5 pages.
CA3,142,015 , "Office Action", Sep. 23, 2022, 5 pages.
CA3,142,027 , "Office Action", Oct. 5, 2022, 4 pages.
JP2021-576695 , "Office Action", Nov. 1, 2022, 7 pages.
JP2021-576748 , "Office Action", Nov. 1, 2022, 4 pages.
Indian Application No. 202117058685 , "First Examination Report", Jun. 29, 2022, 6 pages.
U.S. Appl. No. 17/596,944, "Non-Final Office Action", Jun. 14, 2024, 17 pages.
CA3,142,012, "Office Action", May 9, 2024, 5 pages.
CN202080046840.5, "Office Action", Mar. 30, 2024, 6 pages.
CA3,142,015, "Notice of Allowance", Mar. 12, 2024, 1 page.
CA3,142,027, "Notice of Allowance", Mar. 25, 2024, 1 page.
CN202080046685.7, "Office Action", Mar. 29, 2024, 10 pages.
"Final Office Action", Feb. 21, 2025, 16 pages.
"Final Office Action", Dec. 18, 2024, 12 pages.
Shi, et al., "Experimental Study of Woods Under External Heat Flux by Autoignition: Ignition Time and Mass Loss Rate", Journal of Thermal Analysis and Calorimetry, vol. 111, No. 2, Jun. 17, 2012, pp. 1399-1407.
CN202080046685.7 , "Office Action", Dec. 19, 2022, 19 pages.
CN202080046840.5 , "Office Action", Nov. 25, 2022, 18 pages.
EP20740473.2 , "Office Action", Nov. 4, 2022, 6 pages.
CN202080046647.1, "Office Action", Sep. 26, 2023, 13 pages.
CN202080046840.5, "Office Action", Aug. 18, 2023, 12 pages.
EP20740473.2, "Intention to Grant", Oct. 18, 2023, 8 pages.
JP2021-576698 , "Notice of Decision to Grant", Nov. 21, 2023, 2 pages.
CN202080046685.7 , "Office Action", Jul. 12, 2023, 13 Pages.
EP20740473.2 , "Office Action", May 24, 2023, 5 pages.
JP2021-576695 , "Notice of Decision to Grant", Jul. 4, 2023, 2 pages.
JP2021-576698 , "Office Action", Jun. 6, 2023, 4 pages.
KR10-2021-7040743 , "Office Action", May 16, 2023, 5 pages.
Beheshti et al., "Black Dross: Processing Salt Removal from Black Dross by Thermal Treatment", Journal of Metals, vol. 66, Issue 11, Oct. 16, 2014, 10 pages.
Castellani et al., "Comparative Analysis of Monitoring Devices for Particulate Content in Exhaust Gases", Sustainability, vol. 6, No. 7, Jul. 11, 2014, pp. 4287-4307.
Huang et al., "Mineral phases and metals in baghouse dust from secondary aluminum production", Chemosphere 134 (2015): 25-30.
National Risk Management , "Second Aluminum Processing Waste: Saltcake Characterization", Office of Research and Development, U.S. Environmental Protection Agency, Mar. 2011.
Application No. PCT/US2020/039803 , International Search Report and Written Opinion, Mailed on Sep. 17, 2020, 11 pages.
Pyrogenesis Canada Inc. , Drosrite, Maximizing aluminum recovery salt-free.
Ridderbusch et al., "From Oxide Residues of Al-Slag-Treatment to Sial-Masteralloys via Carbothermic Reduction", SiAl-masteralloys via carbothermic reduction, Available Online at: URL:http://www.metallurgie.rwth-aachen.de/old/images/pages/publikationen/maik ridder busc id 5763.pdf, Dec. 2009, 16 pages.
Stark et al., "Aluminum waste reaction indicators in a municipal solid waste landfill", Journal of geotechnical and geoenvironmental engineering 138.3 (2012): 252-261.
Tsakiridis et al., "Aluminium Salt Slag Characterization and Utilization—A Review", Journal of Hazardous Materials, vol. 217, 2012, pp. 1-10.
JP2021-576748 , "Notice of Decision to Grant", Sep. 5, 2023, 3 pages.
KR10-2021-7041958 , "Office Action", Jul. 21, 2023, 15 pages.
KR1020217042266 , "Office Action", Jul. 21, 2023, 14 pages.
U.S. Appl. No. 17/596,938, "Non-Final Office Action", Aug. 28, 2024, 18 pages.
Aziz et al., "Pretreated Aluminium Dross Waste as a Source of Inexpensive Alumina-spinel Composite Ceramic Hollow Fibre Membrane for Pretreatment of Oily Saline Produced Water", Ceramics International, vol. 45, No. 2, Feb. 1, 2019, pp. 2069-2078.
JP2023-107001, "Office Action", Jul. 16, 2024, 7 pages.
Application No. MX/A/2021/015701 , Office Action, Mailed on Jul. 16, 2025, 5 pages.
Application No. MX/A/2021/015566 , Office Action, Mailed on Aug. 5, 2025, 6 pages.

(56) References Cited

OTHER PUBLICATIONS

U.S. Appl. No. 17/596,938 , Notice of Allowance, Mailed on Feb. 17, 2026, 12 pages.
Application No. CA3142015 , Office Action, Mailed on Feb. 2, 2026, 4 pages.
Application No. EP20742585.1 , Office Action, Mailed on Jan. 8, 2026, 7 pages.
Application No. MX/A/2021/015566 , Office Action, Mailed on Dec. 17, 2025, 16 pages.
Application No. MX/A/2021/015567 , Notice of Allowance, Mailed on Jan. 14, 2026, 3 pages.
Ridderbusch et al., "Si Al-Masteralloys via Carbothermic Reduction from Oxide Residues of Al-Slag-Treatment to Si Al-Masteralloys via Carbothermic Reduction", Available online at:http://www.metallurgie.rwthaachen.de/old/images/pages/publikationen/maik ridderbusc id 5763.pdf, Dec. 31, 2009.
U.S. Appl. No. 17/596,938 , Advisory Action, Mailed on May 7, 2025, 4 pages.
Application No. BR112021024129-9 , Office Action, Mailed on Jun. 10, 2025, 4 pages.
Application No. BR112021024214-7 , Office Action, Mailed on Jun. 10, 2026, 6 pages.
Application No. BR112021024238-4 , Notice of Allowance, Mailed on May 6, 2025, 2 pages.
Application No. BR112021024129-9 , Notice of Allowance, Mailed on Nov. 11, 2025, 2 pages.
Application No. BR112021024214-7 , Notice of Allowance, Mailed on Nov. 11, 2025, 2 pages.
Application No. KR10-2024-7010600 , Office Action, Mailed on Nov. 18, 2025, 12 pages.
Application No. MX/A/2021/015701 , Notice of Allowance, Mailed on Dec. 4, 2025, 3 pages.
Application No. JP2023-107001 , Office Action, Mailed on Feb. 4, 2025, 8 pages.

* cited by examiner

OXIDATIVE ROASTING OF BLACK DROSS AND SALT CAKE

CROSS-REFERENCE TO RELATED APPLICATION

This application is a national stage application, filed under 35 U.S.C. § 371, of International Patent Application No. PCT/US2020/039803, filed on Jun. 26, 2020 which claims the benefit of and priority to U.S. Provisional Application No. 62/867,721, filed on Jun. 27, 2019, and titled "OXIDATIVE ROASTING OF BLACK DROSS AND SALT CAKE," the content of both of which are herein incorporated by reference in their entireties for all purposes.

TECHNICAL FIELD

The present disclosure relates to metal recycling generally and more specifically to treatment and use of dross from aluminum recycling.

BACKGROUND

Byproducts of metal recycling, and specifically aluminum recycling, can be difficult to handle and process. For example, aluminum recycling generally produces black dross or white dross as a byproduct of the recycling process. Black dross generally contains some aluminum, a moderate amount of aluminum oxides, and a substantial portion of salts. For example, some black dross resulting from the recycling of used beverage can (UBC) stock produces black dross having about 10% aluminum, 50% salts, and 40% oxides, although other amounts may occur. White dross is a mixture of oxides and metallic aluminum and normally contains very little salt. The metal in white dross is most often recovered by treating the dross with salts at high temperatures. This results in an oxide/salt byproduct commonly referred to as salt cake. These byproducts can contain nitrides, carbides, and other materials.

The byproducts can be hazardous and can require highly-controlled transportation and disposal operations. For example, dross from aluminum recycling can generate explosive hydrogen when wet, and thus must be carefully handled. Current dross treatment technologies generally require separate facilities, and thus the dross must be transported from the location of its generation to a treatment facility. In some countries, regulations prohibit various handling and disposal of such materials. Current technologies that treat dross focus on recovery of the metal (e.g., aluminum) through heating and melting, and recovery of the salt through leaching and evaporation. These current technologies rely on high power output, such as heating of batches of white dross to remove metal and using large amounts of water and energy to leach salt from dross or salt cake and evaporating that water to recover the salt. The water and energy used to leach salt from dross is significant enough that certain current white dross treatment techniques specifically focus on a salt-free process to avoid having to recover salt at a later step. Additionally, leaching salt from dross can generate substantial noxious, toxic, and/or reactive gases (e.g., $H_2S$, $PH_3$, $NH_3$, $H_2/CH_4$), which require controlled collection and destruction.

Thus, there is a desire for improved handling and treatment of dross from aluminum recycling such that components of the dross can be more easily and efficiently recovered and such that the dross can be more easily and efficiently handled.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

In various examples, a method of extracting salt from metal recycling byproduct is provided. The method can include charging a vessel with dross. The dross may include aluminum oxides and salt. The method may further include heating the dross to a temperature at or greater than a boiling point of the salt. The method may further include maintaining the dross at the temperature to permit evaporation of the salt as salt vapor. The method may further include directing the salt vapor out of the vessel through a gas outlet. The method may further include capturing the salt vapor.

In various examples, a system for extracting salt from metal recycling byproducts is provided. The system may include a vessel for receiving dross. The dross may include aluminum oxides and salt. The system may further include a heat source coupled to the vessel for heating the dross to a temperature sufficiently high to evaporate the salt as salt vapor (e.g., 1200° C. or above). The system may further include a gas outlet coupled to the vessel for conveying gas and salt vapor from the vessel. The system may further include a salt collector coupled to the gas outlet for collecting and condensing the salt vapor.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
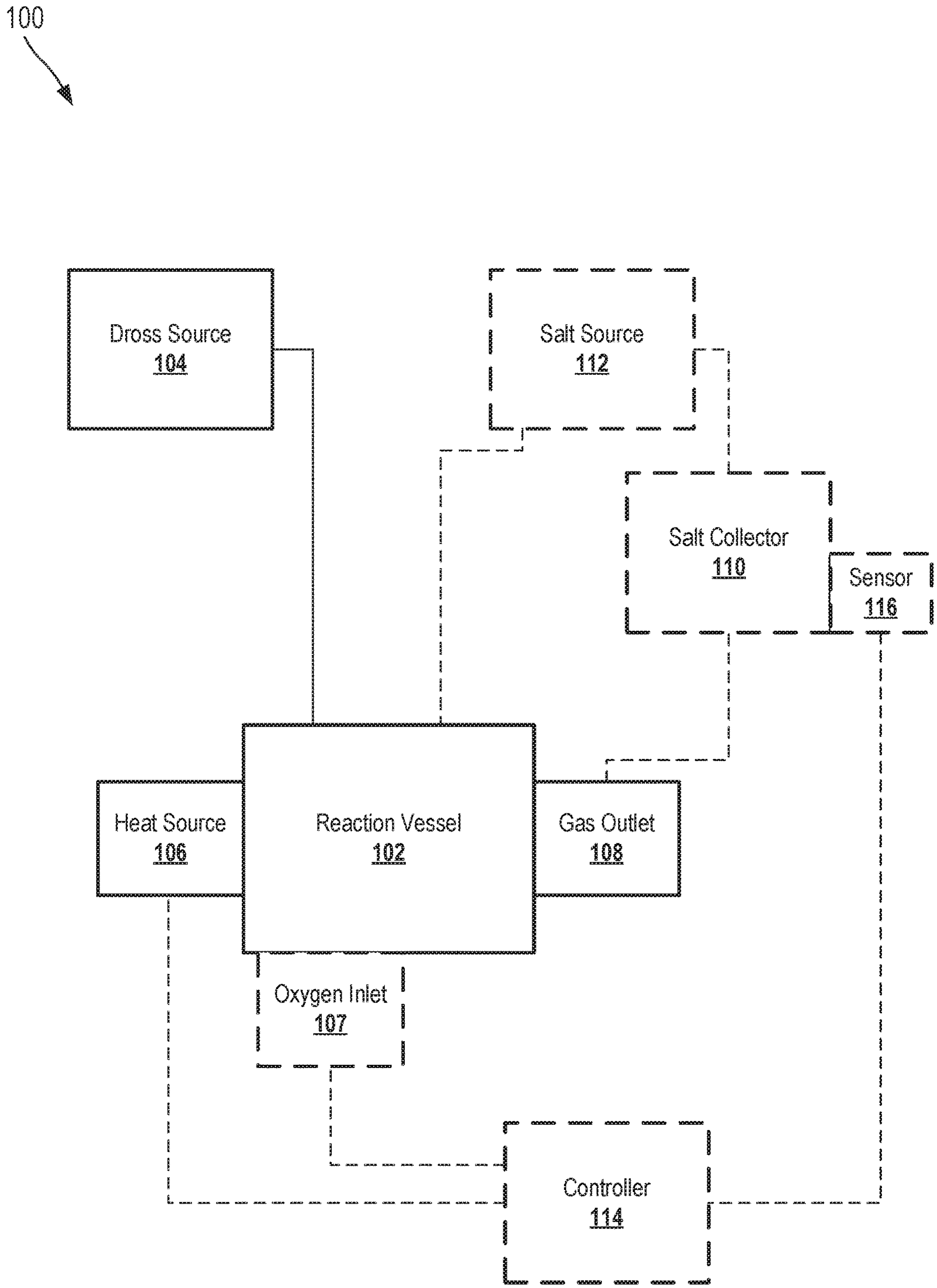
FIG. 1 is a schematic diagram of a dross thermal processing system according to certain aspects of the present disclosure.

Certain aspects and features of the present disclosure relate to techniques for extracting and capturing salt during dross treatment. During dross treatment, temperatures can be permitted to exceed the boiling point of one or more salt components of the dross, preferably in an oxidizing environment. The temperature can be held sufficiently high such that the salt content can exert an appreciable vapor pressure and can be held for a sufficient time to permit most, all, or substantially all of the salt content to evaporate, leaving behind the non-volatile components of the dross. The evaporated salt can be condensed and collected.

Metal recycling, such as aluminum recycling, can result in secondary metal (e.g., secondary aluminum) and various recycling byproducts. For example, in aluminum recycling processes, the recycling byproducts can be types of dross, or mixtures of metallic aluminum and aluminum oxides. In some cases, other materials in the aluminum being recycled can include contaminants and salts, which can end up in the dross. Different types of dross can exist, such as white dross and black dross. White dross consists primarily of aluminum and aluminum oxides, whereas black dross additionally contains salts. The terms white and black when used with respect to dross refers to a type of dross, and not necessarily the physical color of the dross. In some cases, processing white dross can include combining the white dross with salts to facilitate extraction of secondary metal.

Black dross is a common byproduct of recycling used beverage can (UBC) stock, in which approximately 2% of salt by weight is used to remove impurities and oxides from the aluminum in the UBC stock. The recycling processes for UBC stock result in black dross balls or chunks having various sizes on the order of tens of millimeters (e.g., 25 mm) in diameter. These black dross balls generally contain approximately 10% aluminum, 50% salt, and 40% oxides and additional contaminants by weight.

White dross is a common byproduct of many other types of aluminum recycling processes. White dross can contain a substantial amount of aluminum that can be removed through further processing by contacting the white dross with salt to generate salt cake. As used herein, the general term dross is inclusive of salt cake generated from combining white dross with salt.

It has been found, such as from recycling UBC, that black dross in its native form can retain carbon up to approximately 4% by weight even after thermal treatment. Generally, thermal treatment of native black dross can form a layered ball wherein the outermost layers are covered with complex oxides and the innermost layers contain non-oxidized carbon and other compounds. It was determined that a larger surface-to-volume ratio can be desirable to ensure more of the residual carbon in the black dross is reacted with oxygen.

Crushing black dross prior to thermal treatment may be potentially problematic, at least in part because the black dross fines are difficult to handle and can become entrained in gas being output from the reaction vessel (e.g., rotary kiln). In cases where salt vapor is collected from the reaction vessel, such as described herein, black dross fines may become entrained in the output gas which can contaminate the salt vapor.

To avoid the problem with black dross fines, disintegrated black dross (e.g., disintegrated through crushing or any other suitable technique) can be agglomerated into pellets. In some cases, the pellets can have a form that is tailored to achieve desirable thermal processing. For example, the pellets can have channels throughout, through which oxygen can pass and out of which salt vapor can escape. In some cases, a channel can pass through the pellet, although that need not always be the case. In some cases, a channel can be single-ended and can extend from a surface of the pellet partially into the pellet. Pellets can be formed through pelletization, compaction, or any other agglomeration technique. In some cases, pellets can be formed using techniques that create inherent channels. In some cases, black dross fines can be mixed with additives prior to agglomeration such that the additives form channel precursors in the pellets. Upon oxidation, the additives can decompose, leaving voids that form or expose the channels in the pellets. The additives can be selected to oxidize, volatize, or otherwise decompose at sufficiently low temperatures such that the channels are exposed by the time thermal processing temperatures are reached for processing of the black dross. For example, additives can be selected that oxidize at temperatures at or below approximately 500° C., 600° C., 700° C., or 800° C., or between approximately 500° C. and 800° C. The temperature at which the additive oxidizes, volatizes, or otherwise decomposes and exposes the channels can be referred to as a channel exposure temperature. The pellets thus comprise channels when heated to temperatures at or above the channel exposure temperature. For example, a pellet can comprise channels when heated to temperatures at or above 800° C. for additives that oxidize at temperatures at or below 800° C., including additives that oxidize at temperatures at or below 500° C.

In some cases, the disintegrated black dross can form fines having diameters at or less than approximately 10 mm, 9 mm, 8 mm, 7 mm, 6 mm, 5 mm, 4 mm, 3 mm, or 2 mm at an upper range end and diameters at or above approximately 50 micrometers, 40 micrometers, 30 micrometers, 20 micrometers, 10 micrometers, or 5 micrometers at a lower range end. In some cases, an eddy current separator can be used to remove excess metallic aluminum from the black dross fines. In some cases, the black dross fines can be screened to remove oversized particles, which can be diverted back for further disintegration or can be fed forward for thermal processing.

In some cases, the agglomeration process can result in black dross pellets having consistent sizes, such as pellets having diameters (e.g., a maximum diameter of a pellet or an average diameter of a pellet) between 5 mm and 50 mm, between 10 mm and 50 mm, between 10 and 40 mm, between 10 and 30 mm, between 10 and 20 mm, between 12 mm and 18 mm, or 14 mm and 16 mm. In some cases, the variation between pellets can be at or less than approximately 10 mm, 9 mm, 8 mm, 7 mm, 6 mm, 5 mm, 4 mm, 3 mm, 2 mm, or 1 mm. The consistent size of the pellets can facilitate successful estimation of processing times for thermal processing.

In some cases, additives can include waste materials from other industries. For example, additives can include one or more of automobile shredder fluff, post-consumer scrap (e.g., shredded plastic bottles or agricultural byproducts such as corn silk, wheat chaff, straw, or rice hulls), textile residues, carpet residues, UBC decoater dust, or other such products. In some cases, additives can be selected to provide a certain degree of permeability to a pellet at elevated temperature (e.g., at or above 500° C.). In some cases, additives can additionally include fuel additives selected to provide fuel to help generate heat within the reaction vessel. In some cases, an additive can be selected to provide fuel and also improve the permeability of a pellet at elevated temperature.

In some cases, the agglomerated pellets can be generally spheroid in shape, although that need not be the case and other regular or irregular shapes may be utilized. In some cases, pellets can have a smooth surface or a rough surface. In some cases, pellets can be further pre-processed to alter the physical shape of the pellet to facilitate permeability of the pellet to gasses.

In some cases, black dross pellets tailored as described herein can improve the efficiency and speed of salt extraction. In some cases, black dross pellets tailored as described herein can improve the oxidation of residual carbon, residual metallic aluminum, and/or other residual compounds. In some cases, the black dross pellets can be used in conjunction with a reaction vessel designed to maintain an oxidative environment.

In some cases, salt can be extracted from dross containing salt through thermal processing. Traditionally, thermal processing of dross is carried out at temperatures well below 1200° C. However, by permitting or encouraging the reaction vessel to reach temperatures at or above 1200° C., the salt can be evaporated as salt vapor and be directed out of the reaction chamber, such as through a gas outlet. In some cases, the reaction vessel is permitted or encouraged to reach a temperature at or above the boiling points of salts within the dross (e.g., 1416° C. for KCl or 1450° C. for NaCl) to increase the rate at which the salt is evaporated as salt vapor and directed out of the reaction chamber. In some cases, the gas outlet can also function as a material inlet. While a reaction vessel may be capable of supporting temperatures in the range of up to 1200° C. to 1600° C., these temperature ranges were previously not generally used in the aluminum industry. Dross can be maintained at these high temperatures until approximately 95%, 99%, 99.9%, or other relevant amount of the salt in the dross has evaporated. In some cases, dross can be maintained at these high temperatures for approximately 30 minutes, 35 minutes, 40 minutes, 45 minutes, 50 minutes, 55 minutes, 60 minutes, 65 minutes, 70 minutes, 75 minutes, 80 minutes, 85 minutes, 90 minutes. 95 minutes, 100 minutes, 105 minutes, 110 minutes, 115 minutes, 120 minutes, 125 minutes. 130 minutes, 135 minutes, 140 minutes, 145 minutes, or 150 minutes. In some cases, such as for small and permeable dross, the dross can be maintained at these high temperatures for approximately 10 minutes, 15 minutes, 20 minutes, 25 minutes, or 30 minutes. In some cases, the use of pelletized dross can facilitate oxidation of residual compounds in the dross, which can facilitate reaching and/or maintaining these high temperatures with only the addition of oxygen to the reaction vessel (e.g., without supplying heat to the reaction vessel through a separate heat source, such as an oxy-fuel burner).

Salt vapor exiting the reaction vessel can be collected and condensed into salt, which can be collected and optionally reused for further treatment of dross (e.g., white dross) or UBC (e.g., in a sidewell furnace).

In some cases, maintaining these high temperatures necessary to extract salt from dross via an evaporative route results in an unexpected formation of a continuous, dense layer of oxide adhering to the refractory inner surface of the reaction vessel. Although this oxide layer can be removed periodically (e.g., to avoid losing reactor volume), its presence can provide a degree of protection to the underlying refractory from abrasive wear, thermal shock, and chemical attack, thus extending the life of the reaction vessel. Surprisingly, maintaining these high temperatures necessary to extract salt from dross via an evaporative route results in the removal of aluminum nitrides; and thus enables more efficient recycling of certain drosses or dross treatment processes that have relatively high amounts of aluminum nitride.

In some cases, a two-stage dross treatment process can be performed. In a first stage, white dross is contacted with salt at a first temperature to recover metal, with salt cake generated as a byproduct. In a second stage, the salt cake can be thermally processed at a second temperature (e.g., at a temperature sufficiently high to evaporate the salt, in some cases, at a temperature at or above the boiling point of the salt) to evaporate the salt as salt vapor for collection and condensation into salt. In some cases, the salt vapor and/or salt can be temporarily stored and reused in the subsequent treatment of additional white dross. In some cases, increased amounts of salt can be obtained by mixing existing black dross in with the white dross and/or the salt cake prior to the second stage. In some cases, the second stage can include oxidizing residual compounds in the dross, such as remaining metal.

In some cases, each stage of the two-stage dross treatment process can occur in the same vessel, although that need not always be the case. When a single vessel is used, residual heat remaining after removal of the inert oxides after the second stage can be used to begin heating new white dross in a subsequent treatment process. Thus, the two-stage dross treatment process can involve the reuse of salt and thermal energy between a second stage of a treatment process and a first stage of a subsequent treatment process.

In some cases, the two-stage dross treatment process can facilitate the recycling of low grade scrap (e.g., thermal break material). In such cases, the white dross provided to the reaction vessel comes from the melting of the scrap within the reaction vessel. In such cases, the scrap can be melted, secondary aluminum can be tapped off, salt can be added to produce salt cake, additional secondary aluminum can be tapped off, and the heat and oxygen can be increased to evaporate the salt and generate the inert oxide residue.

In some cases, additional organic-rich material can be added to provide some of the energy required to achieve the high temperatures in the second stage of the two-stage dross treatment process.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a schematic diagram of a dross thermal processing system 100 according to certain aspects of the present disclosure. The system 100 can comprise a reaction vessel 102 in which the thermal processing of the dross can occur. The reaction vessel 102 can be a rotary kiln, although any other suitable reaction vessel can be used. A source of dross 104 can be used to supply the reaction vessel 102 with dross (e.g., white dross, black dross, or salt cake). The reaction vessel 102 can be supplied with initial heat from a heat source 106, such as an oxy-fuel burner. When thermal processing is underway, heat can be increased and/or maintained within the reaction vessel 102 through the addition of oxygen, such as through an optional oxygen inlet 107 or the heat source 106 (e.g., when the heat source 106 is used in a non-heating form to provide oxygen to the reaction vessel 102).

In some cases, a controller 114 can be coupled to the heat source 106 and/or oxygen inlet 107 to control the temperature within the reaction vessel 102. Controller 114 can be coupled to a temperature sensor positioned to read the temperature within the reaction vessel 102.

During thermal treatment, combustion gasses can be expelled from the reaction vessel 102 via a gas outlet 108. In some cases, the gas outlet 108 can be a port in the reaction vessel 102 through which dross is provided into the reaction vessel 102.

In some cases, an optional salt source 112 can provide salt to the reaction vessel 102, such as in the processing of white dross.

Generally, salt can be recovered from the black dross and salt cake by dissolving the salt in water, removing the insoluble solids in the salt, and then evaporating the water to recover the salt. However, using this process, the salt can contain occluded water (e.g., small pockets of water that were physically/mechanically trapped within the salt crystals during evaporation and drying). When the salt containing occluded water is rapidly heated (e.g., by depositing the salt onto the surface of molten aluminum) the trapped moisture generates pressure that can cause decrepitation (e.g., the salt spits or sizzles). In some cases, a salt collector 110 can be coupled to the gas outlet 108 to receive salt vapor and collect salt from the salt vapor (e.g., through condensation of the salt vapor). In some cases, the salt collector 110 can be coupled to the salt source 112 to replenish the salt source 112 through the extraction of salt from dross within the reaction vessel 102. The salt collected by the salt collector 110 may not contain occluded water and can be rapidly heated without causing decrepitation. Using the salt collector 110 to replenish the salt source 112 allows for faster processing of the salt because additional steps do not need to be taken to prevent decrepitation.

In some cases, an optional sensor 116 (e.g., an optical sensor) can be coupled to the salt collector 110 and/or the gas outlet 108 to detect a concentration of salt in the salt vapor (e.g., through optical inspection of the opacity of the salt vapor). The sensor 116 can be coupled to controller 114 to provide feedback to control the temperature of the reaction vessel 102 in response to changes in the concentration of salt in the salt vapor. For example, once the concentration of salt in the salt vapor drops below a threshold, a determination can be made that at least 95%, 99%, 99.1%, 99.2%, 99.3%, 99.4%, 99.5%, 99.6%, 99.7%, 99.8%, or 99.9% or other relevant amount of the salt has been extracted from the dross within the reaction vessel 102, and the controller 114 can control the heat source 106 and/or oxygen inlet 107 to reduce the temperature within the reaction vessel 102.

While the system 100 can be used with any suitable metals, the system 100 can be advantageously used with dross from aluminum recycling.

Figure 2:
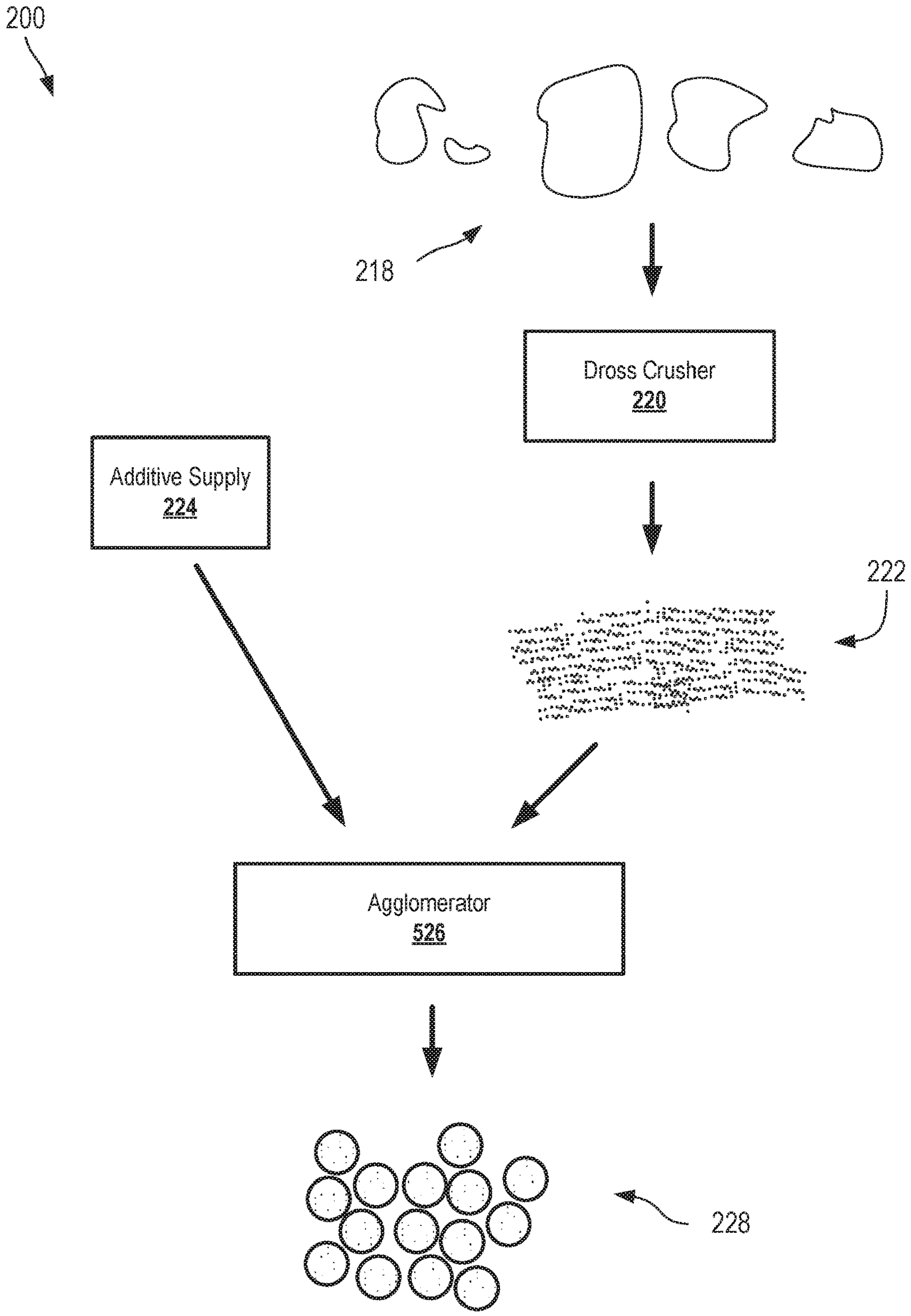
FIG. 2 is a schematic diagram of dross pelletizing system according to certain aspects of the present disclosure.

FIG. 2 is a schematic diagram of dross pelletizing system 200 according to certain aspects of the present disclosure. Dross pieces 218 can be spherical or other shaped, and can contain oxides (e.g., aluminum oxides) and other materials, such as metal (e.g., metallic aluminum) and salt. The dross pieces 218 can have inconsistent sizes, such as sizes ranging from 10 mm in diameter to 50 mm in diameter, although pieces of other sizes can be present. The dross pieces 218 can be introduced to a dross crusher 220, which can crush the dross pieces 218 into dross particles 222 (e.g., dross fines). The dross particles 222 can have diameters of at or less than 10 mm, 9 mm, 8 mm, 7 mm, 6 mm, 5 mm, 4 mm, 3 mm, 2 mm, or 1 mm. The dross particles 222 can be mixed with additives from an additive supply 224 and then introduced to an agglomerator 526. The agglomerator 526 can be a pelletizer, or other suitable device for turning the dross particles 222 and additives into dross pellets 228. The dross pellets 228 can have a relatively uniform size on the order of 10 mm to 20 mm in diameter. In some cases, the pelletizer can be an extrusion pelletizer designed to generate extruded pellets having an oblong or elongated shape. As used herein, reference to a diameter of an oblong or elongated shape can refer to a maximum or average diameter of a cross section of an oblong or elongated shape, or to a maximum or average length of an oblong or elongated shape. In some cases, pellets may have a length to diameter ratio of 0.5, 0.6. 0.7, 0.8, 0.9, 1.0, 1.1, 1.2, 1.3, 1.4, 1.5, 1.6, 1.7, 1.8, 1.9, or 2.0.

The proportions of additives and dross particles 222 can be controlled to achieve a desired permeability of the resultant dross pellets 228 upon heating the dross pellets 228 to a channel exposure temperature (e.g., a temperature at which the additive oxidizes and exposes the channels within the dross pellets 228).

Figure 3:
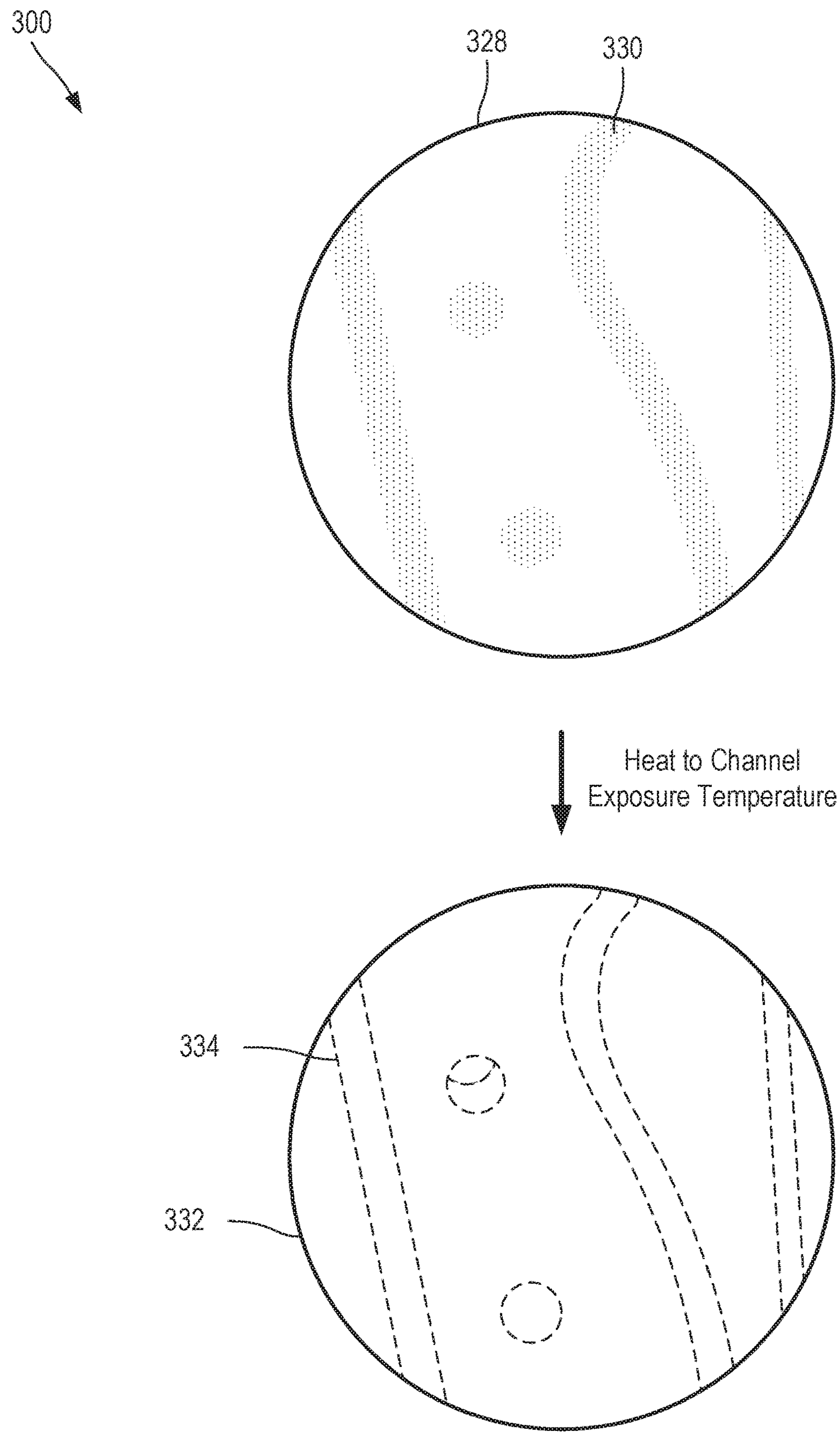
FIG. 3 is a schematic diagram of a dross pellet being heated according to certain aspects of the present disclosure.

FIG. 3 is a schematic diagram of a dross pellet 328 being heated according to certain aspects of the present disclosure. The dross pellet 328 can be a dross pellet 228 from FIG. 2. The dross pellet 328 can comprise dross imbued with additives. The additives can establish channel precursors 330 within the pellet 328.

After heating the pellet 328 to a channel exposure temperature for a sufficient amount of time, the additives can oxidize, volatize, or otherwise decompose. The resultant channeled pellet 332 can contain channels 334 therethrough. Channels 334 can pass through the channeled pellet 332 in any direction, although in some cases a channel 334 can extend less than through the channeled pellet 332 (e.g., to achieve a single-ended channel 334). In some cases, channels 334 can be surrounded by dross material of the channeled pellet 332 (e.g., forming a void through the channeled pellet 332). In some cases, however, channels 334 can form entirely on the surface of the channeled pellet 332, such as in the shape of surface valleys.

The channels 334 in the channeled pellet 332 can effectively increase the surface-to-volume ratio of the pellet, can permit oxygen to more effectively permeate the pellet, and can permit salt vapor to more effectively escape the pellet.

Figure 4:
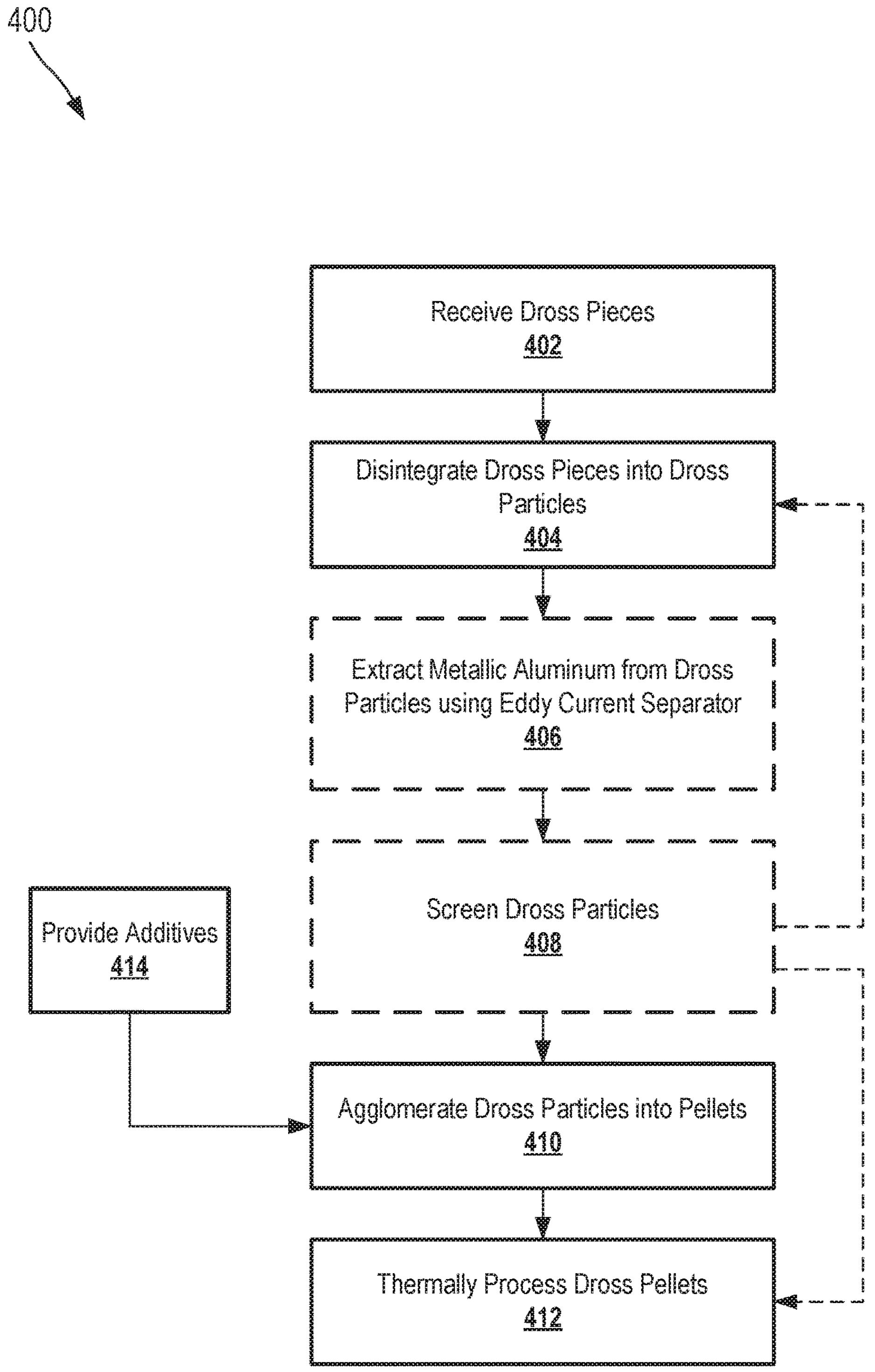
FIG. 4 is a flowchart depicting a process for generating dross pellets according to certain aspects of the present disclosure.

FIG. 4 is a flowchart depicting a process 400 for generating dross pellets according to certain aspects of the present disclosure. Process 400 can be used to generate dross pellets 228 or dross pellets 328 of FIG. 2 or 3, respectively.

At block 402, dross pieces can be received. At block 404, the dross pieces can be disintegrated. Disintegration can be achieved by crushing, grinding, or otherwise interacting with the dross pieces to reduce the size to dross particles having diameters of at or less than 10 mm, 9 mm, 8 mm, 7 mm, 6 mm, 5 mm, 4 mm, 3 mm, 2 mm, or 1 mm.

At optional block 406, metallic aluminum can be extracted from the dross particles (e.g., disintegrated or crushed dross pieces) using an eddy current separator.

At optional block 408, the dross particles can be screened for size. Screening the dross particles can include separating out oversized particles. In some cases, oversized particles can be directed back to be further disintegrated at block 404. In some cases, oversized particles can be fed forward to be thermally processed at block 412.

At block 410, dross particles can be agglomerated (e.g., reconstituted) into pellets. Agglomerating the dross particles into pellets can occur through pelletization, compaction, or any other suitable technique for generating pellets. In some cases, additives can be provided at block 414 and used during agglomeration at block 410 to generate a pellet comprised of dross particles and additives. The amount and/or type of additives can be controlled to achieve a desired permeability of the resultant pellet.

At block 412, the dross pellet can be thermally processed. Thermal processing a dross pellet can include heating the dross pellet to extract a compound, such as metal or salt. In some cases, the thermal processing at block 412 may solely include pellets agglomerated at block 410. In some cases, the thermal processing at block 412 may additionally or alternatively include oversize particles fed forward from the screening at block 408. For example, at least some of the oversize particles fed forward may be sufficiently large to avoid becoming airborne fines that could contaminate an exhaust stream during thermal processing at block 412 and/or may be sufficiently small to facilitate extraction through thermal processing at block 412 without being subjected to an intervening operation at blocks 410 and/or 412 relating to agglomerating with other dross particles and/or additives.

Figure 5:
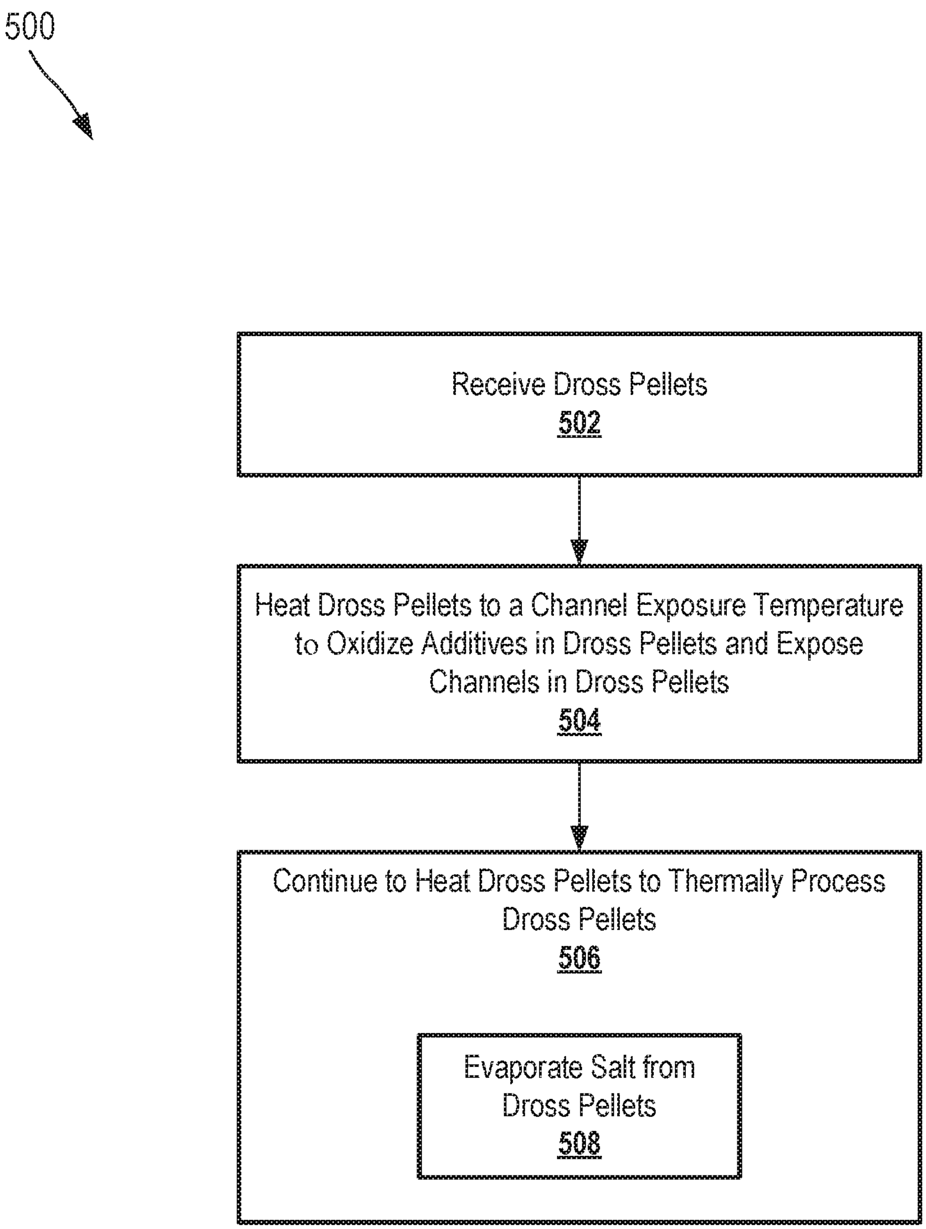
FIG. 5 is a flowchart depicting a process for processing dross pellets according to certain aspects of the present disclosure.

FIG. 5 is a flowchart depicting a process 500 for processing dross pellets according to certain aspects of the present disclosure. At block 502 dross pellets can be received. Dross pellets can contain additives in the shape of channel precursors. At block 504, the dross pellets can be heated to at or above a channel exposure temperature. In some cases, the channel exposure temperature is at or approximately 500° C. In some cases, the channel exposure temperature is at or below 800° C., 700° C., 600° C., or 500° C., or at or between 500° C. and 800° C. Heating the dross pellets at block 504 can cause the additives in the dross pellets to oxidize, volatize, or otherwise decompose, thus exposing the channels within the dross pellet. At block 506, the dross pellets can continue to be heated to thermally process the dross pellets. In some cases, thermally processing the dross pellets at block 506 can comprise evaporating salt from the dross pellets at block 508. In some cases, evaporating salt from the dross pellets at block 508 can comprise passing salt vapors out of the channels of the dross pellets.

Figure 6:
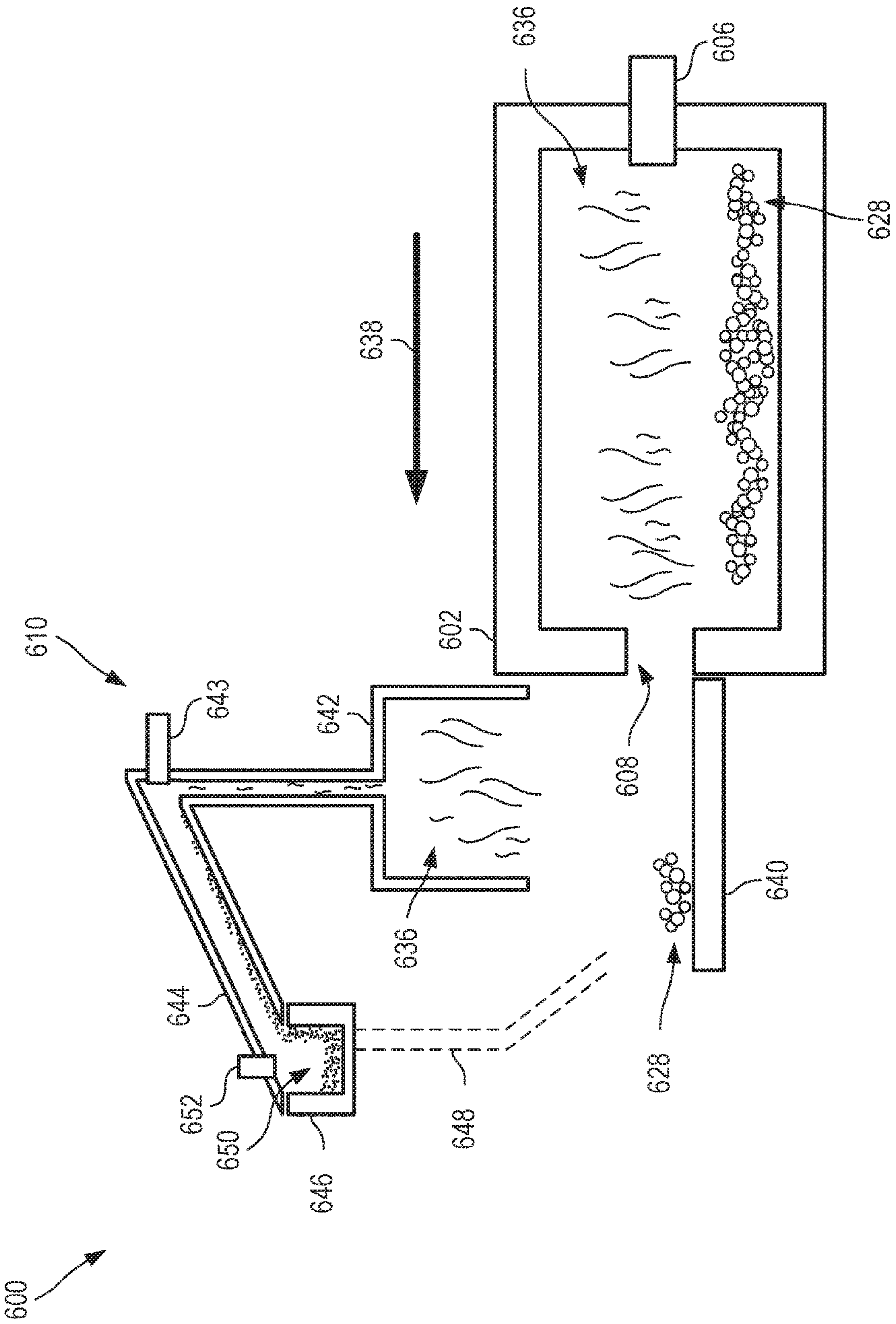
FIG. 6 is a schematic diagram depicting a system for extracting salt from dross according to certain aspects of the present disclosure.

FIG. 6 is a schematic diagram depicting a system 600 for extracting salt 650 from dross 628 according to certain aspects of the present disclosure. The dross 628 can be dross pellets 228 or dross pellets 328 of FIG. 2 or 3, respectively. The system 600 can include a reaction vessel 602. Reaction vessel 602 can be reaction vessel 102 of FIG. 1.

Dross 628 (e.g., black dross or salt cake) can be introduced into the reaction vessel 602 via feed chute 640. A heat supply 606 can provide heated gas and optionally oxygen to the reaction vessel 602 during the treatment process. In some cases, the reaction vessel 602 can rotate to tumble the dross 628. After heating to a sufficient temperature (e.g., a temperature approaching the salt boiling point, and in some cases, a temperature at or above the salt boiling point), salt within the dross 628 can evaporate as salt vapor 636.

Gasses within the reaction chamber 602 can flow in direction 638, conveying the salt vapor 636 out of the gas outlet 608. The salt vapor 636 can be caught in a salt collector 610. The salt collector 610 can include a hood 642 for collecting the salt vapors 636, a condenser 644 for condensing the salt vapor 636 into salt 650, and a salt collection chamber 646 for storing the reclaimed salt 650. In some cases, condensation of the salt vapor may be accomplished or facilitated by ingress into the salt collector 610 of air and/or water (e.g., water spray), such as through an inlet 643 coupled with or included in the condenser 644. In some cases, an optional supply path 648 can redirect reclaimed salt 650 back to the reaction chamber 602 (e.g., via feed chute 640). In some cases, the salt collector 610 can include an extra output 652 for outputting gasses other than the salt fumes 636.

Figure 6A:
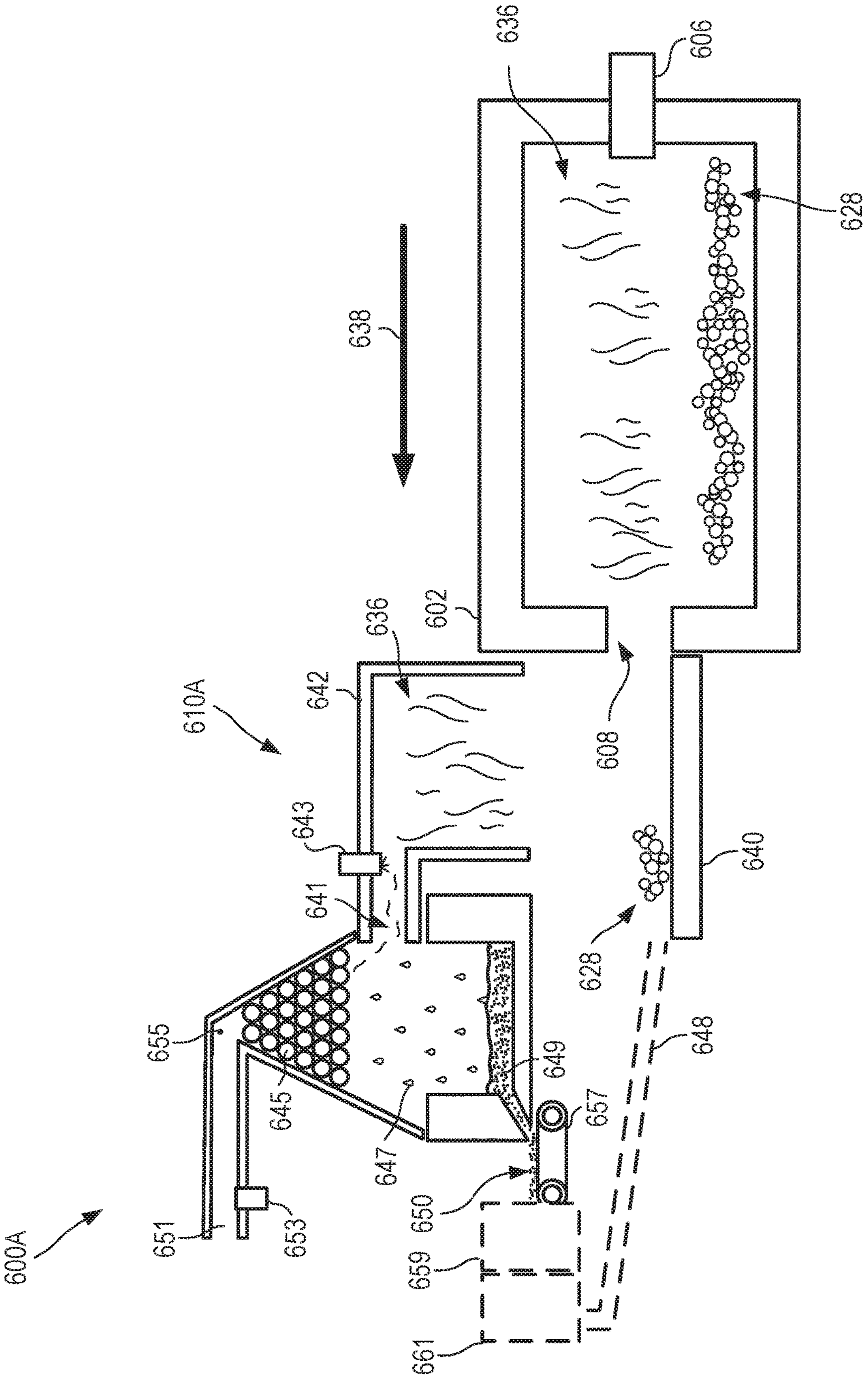
FIG. 6A is a schematic diagram depicting another system for extracting salt from dross according to certain aspects of the present disclosure.

FIG. 6A is a schematic diagram depicting another system 600A for extracting salt 650 from dross according to certain aspects of the present disclosure. The system 600A shown in FIG. 6A can include elements already described with respect to the system 600 shown in FIG. 6. The system 600A shown in FIG. 6A differs from the system 600 shown in FIG. 6 with respect to the salt collector 610A. In the salt collector 610A, the salt vapor 636 collected by the hood 642 may be converted into a liquid salt mist 641 by mixing with water and/or air introduced through a water and/or air inlet 643. A bed of demister media 645 may be positioned in the path of the liquid salt mist 641 and may induce condensation or otherwise cause the liquid salt mist 641 to coalesce into droplets 647 that can fall and be collected as a liquid salt bath within a reservoir 649. One suitable option for the demister media 645 may be tabular alumina spheres, although other types of media may be utilized. The demister media 645 may remove salt from the exhaust stream that may be directed out an exhaust 651 of the salt collector 610A. In some cases, a dilution inlet 653 can introduce additional air into the exhaust stream for further dilution of particulate, e.g., before the exhaust stream is directed further through a fan and/or baghouse.

In some cases, temperature may be monitored and/or regulated to facilitate conditions for causing droplets 647 to coalesce. A temperature at a reference point 655 downstream of the demister media 645 may be measured by a suitable temperature sensor and provide input for adjusting an amount of water and/or air introduced through the water and/or air inlet 643. For example, an increase in introduced air and/or water may be triggered to decrease a downstream temperature or a decrease in introduced air and/or water may be triggered to increase a downstream temperature. As an illustrative example, water and/or air introduced through the water and/or air inlet 643 may be modulated to target a downstream temperature of 800° C. at reference point 655 and/or an input temperature of 850° C. adjacent the water and/or air inlet 643.

Various elements may be included to process reclaimed salt 650 from the liquid salt bath contained in the reservoir 649. For example, the reclaimed salt 650 from the salt bath may be carried by a salt caster 657. In some cases, reclaimed salt 650 may be introduced into a cooler 659 and/or into a crusher 661. In some cases, an optional supply path 648 can redirect reclaimed salt 650 (e.g., in a liquid or solid state) back to the reaction chamber 602 (e.g., via feed chute 640).

Figure 7:
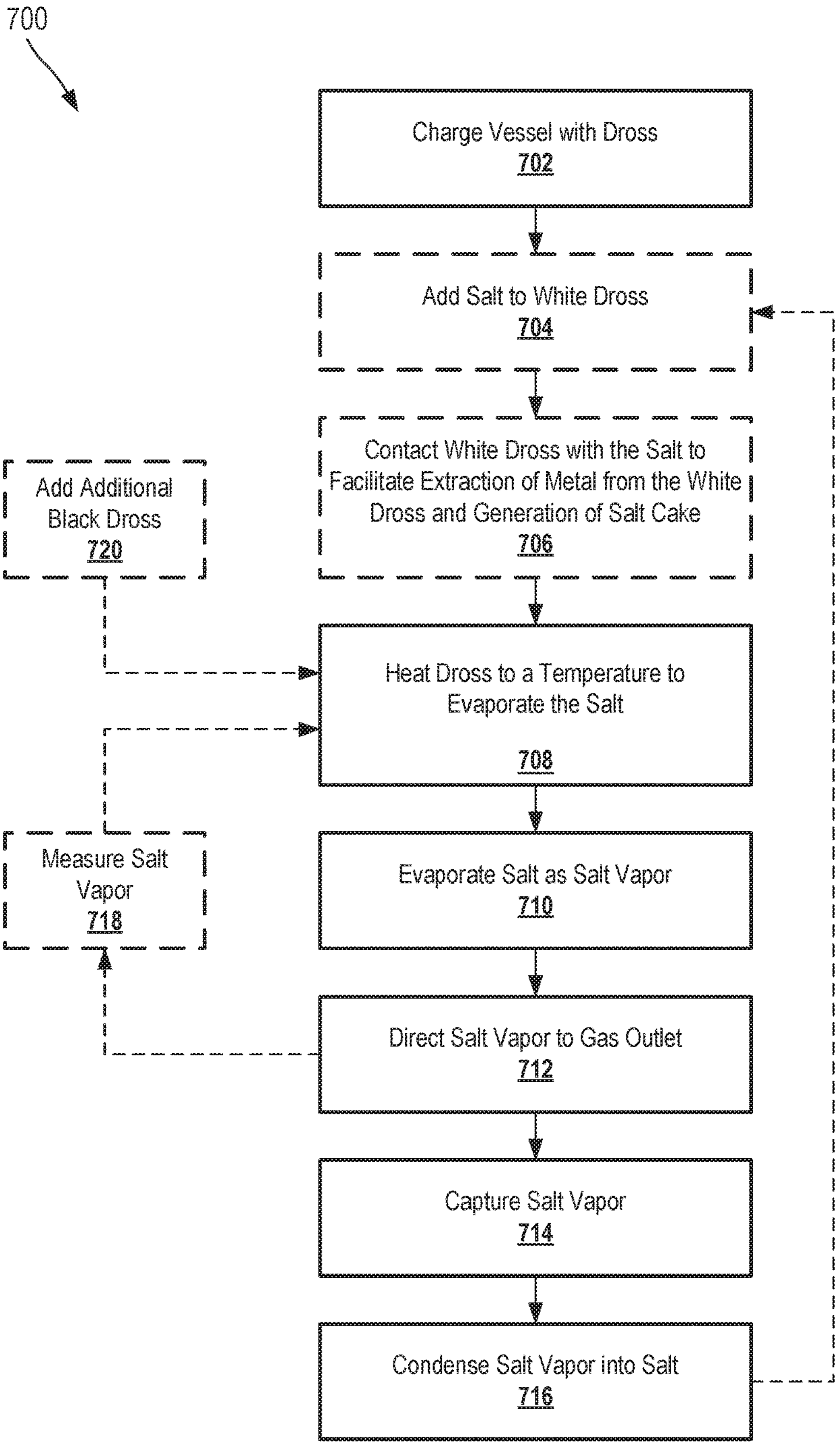
FIG. 7 is a flowchart depicting a process for extracting salt from dross according to certain aspects of the present disclosure.

FIG. 7 is a flowchart depicting a process 700 for extracting salt from dross according to certain aspects of the present disclosure. Process 700 can occur using the system 600 of FIG. 6. Process 700 can occur using the dross pellets 228, 328 of FIGS. 2, 3, respectively.

At block 702, a reaction vessel can be charged with dross (e.g., dross pellets). In some cases, charging the vessel with dross can comprise inputting dross into the reaction vessel. In some cases, charging the vessel with dross can comprise generating dross within the reaction vessel through the melting of scrap metal.

In some cases, the dross can include white dross and additional actions can be performed to generate salt cake and extract metal from the white dross. At optional block 704, salt can be added to the white dross. At optional block 706, the white dross can be contacted with the salt at a first temperature. This contacting and heating can facilitate extraction of metal from the white dross and can facilitate generation of salt cake.

At block 708, the dross (e.g., black dross or salt cake) can be heated to a temperature that is sufficiently high to evaporate the salt (e.g., at 1200° C. or greater). In some cases, the dross can be heated to a temperature that is approaching, at or greater than a boiling point of the salt within the dross. Heating the dross can comprises supplying heat from a heat source (e.g., oxy-fuel burner) or supplying oxygen to facilitate oxidation of fuel within the reaction vessel (e.g., residual carbon). At block 710, the salt can be permitted to evaporate as salt vapor. In some cases, blocks 708 and/or 710 can occur for a duration sufficient to evaporate a desired amount of salt (e.g., 95%, 99%, or 99.9%) from the dross. At block 712, the salt vapor can be directed to a gas outlet. At block 714, the salt vapor can be captured. At block 716, the salt vapor can be condensed into salt (e.g., into solid salt or liquid salt). In some cases, the salt reclaimed at block 716 can be reused in a subsequent block 704 to supply salt to subsequent white dross. In some cases, the salt reclaimed at block 716 may be reused in a use other than generating subsequent salt cake. For example, in some cases, the salt reclaimed at block 716 can be used to facilitate melting of scrap metal.

In some cases, the salt vapor can be measured at optional block 718 to obtain a measurement of salt concentration in the salt vapor. Based on the measurement at block 718, a determination can be made to cease heating the dross and evaporating the salt at blocks 708, 710. In some cases, this determination can be associated with evaporation of a desired amount of salt as determined by the measurement at block 718.

In some cases, additional black dross can be added to the reaction vessel at optional block 720. Additional black dross can permit higher quantities of salt to be evaporated and reclaimed at blocks 710, 712, 714, 716. In some cases, the addition of black dross at block 720 can improve the efficiency of thermally treating subsequent white dross.

Results from one example set of testing are shown in the chart below. In these test runs, the dross samples used had an initial salt level of approximately 50% and were subjected to the temperatures and timing indicated to obtain the measured percentages of salt removed and residual chloride. These results indicated that by operating at elevated temperatures (e.g., at or above boiling points of salt, or even below but near such points), residual chloride salts can be reduced by more than 99% and that the resulting calcined oxide residue can be non-reactive and considered non-hazardous for transport, use, and disposal under the Toxicity Characteristic Leach Procedure (TCLP) standards set by the Environmental Protection Agency (EPA).

| Run # | Starting Temperature (° C.) | Maximum Temperature (° C.) | Total Time (min) | Salt Removal (%) | Residual Chloride (%) |
|---|---|---|---|---|---|
| 1 | 1350 | 1530 | 90 | 99.5 | 0.10 |
| 2 | 1350 | 1520 | 90 | 99.7 | 0.06 |
| 3 | 1300 | 1565 | 100 | 99.8 | 0.04 |
| 4 | 1300 | 1510 | 90 | 99.9 | 0.03 |
| 5 | 1300 | 1500 | 90 | 97.6 | 0.49 |
| 6 | 1300 | 1440 | 135 | 98.3 | 0.34 |
| 7 | 1450 | 1550 | 90 | 99.6 | 0.08 |
| 8 | 1350 | 1450 | 90 | 99.7 | 0.07 |
| 9 | 1350 | 1600 | 90 | 99.9 | 0.03 |
| 10 | 1350 | 1460 | 90 | 99.8 | 0.04 |

Figure 8:
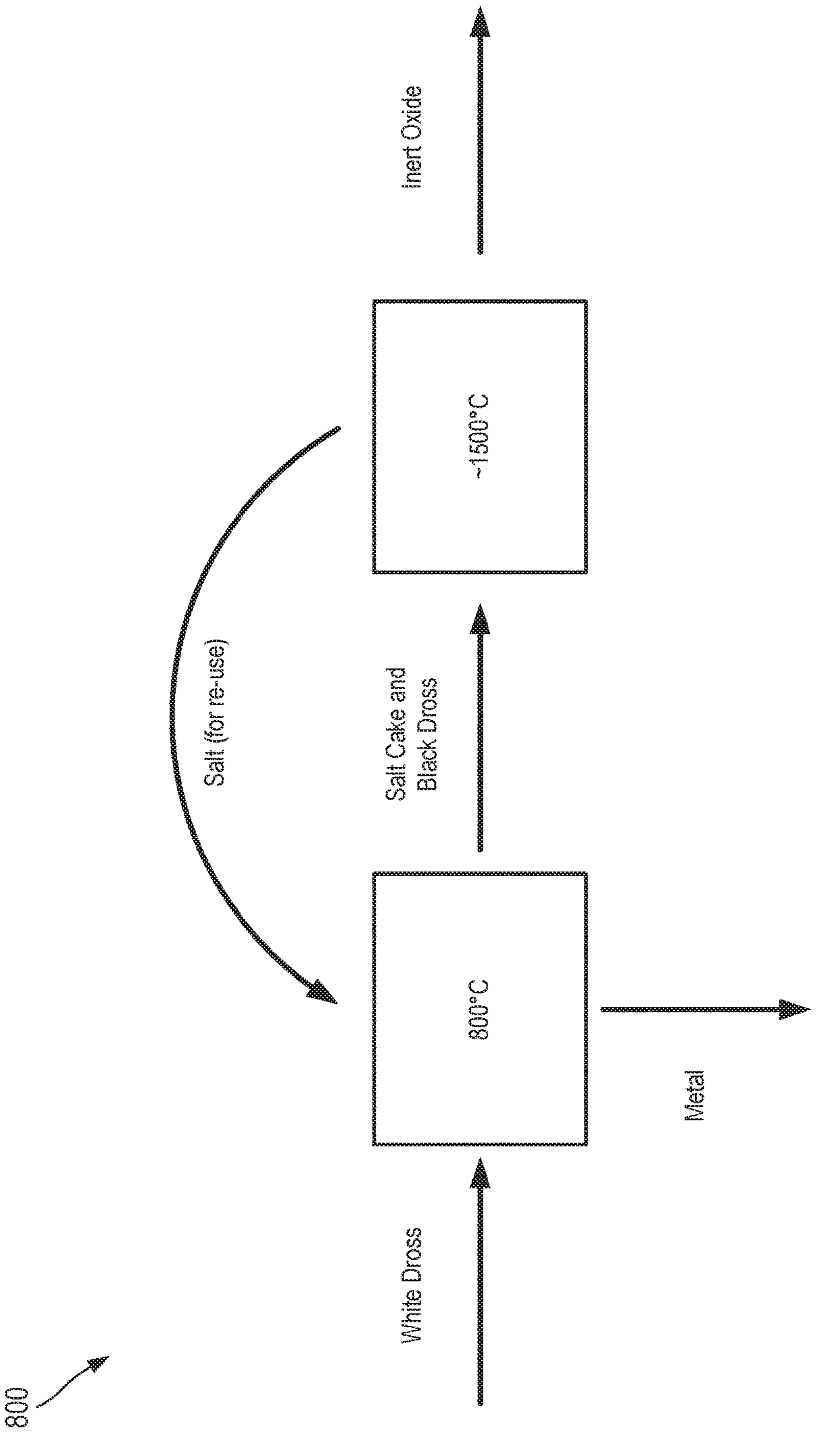
FIG. 8 is a schematic diagram depicting a two-stage process for thermally treating dross according to certain aspects of the present disclosure.

FIG. 8 is a schematic diagram depicting two-stage process 800 for thermally treating dross according to certain aspects of the present disclosure. In a first stage, white dross can be heated within a reaction vessel, in combination with salt, to a first temperature (e.g., at or approximately 800° C.) to extract metal and generate salt cake. In a second stage, salt cake and optional black dross can be heated in a reaction vessel (e.g., the same reaction vessel or a different reaction vessel) to a second temperature that is sufficiently high to extract the salt as salt vapor and result in inert oxides. In some cases, the second temperature is at or exceeds the boiling point of the salt (e.g., at or approximately 1500° C.). The extracted salt can be reused in the first stage for a subsequent treatment.

Figure 9:
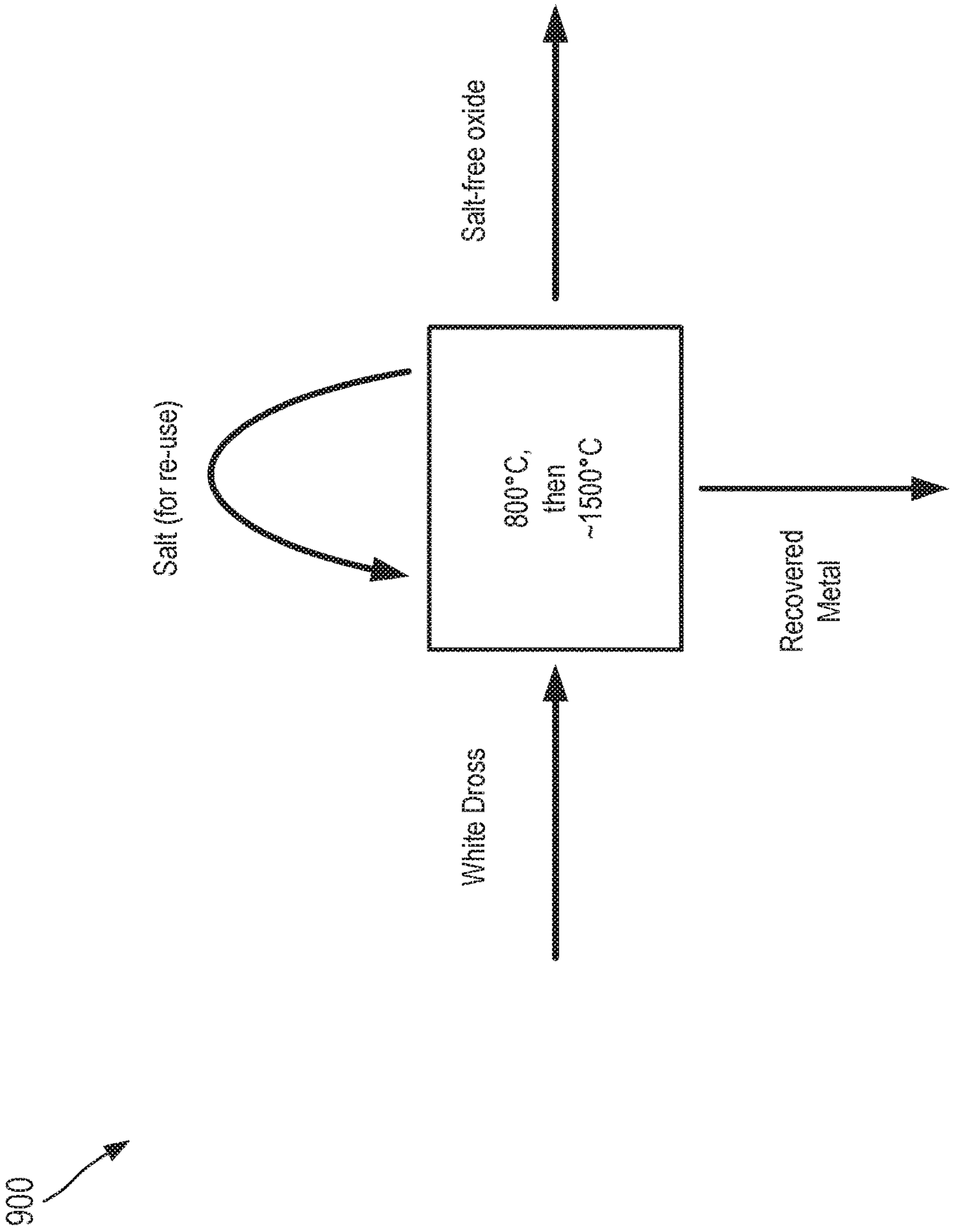
FIG. 9 is a schematic diagram depicting a single-vessel, two-stage process for thermally treating dross according to certain aspects of the present disclosure.

FIG. 9 is a schematic diagram depicting a single-vessel, two-stage process 900 for thermally treating dross according to certain aspects of the present disclosure. Process 900 can be the same as process 800, however specifically performed in a single vessel. In a first stage, white dross can be heated within a reaction vessel, in combination with salt, to a first temperature (e.g., at or approximately 800° C.) to extract metal and generate salt cake. In a second stage, the salt cake within the reaction vessel can be further heated to a second temperature that is sufficiently high to extract salt as salt vapor and output salt-free oxides (e.g., 1200° C. or greater). In some cases, the second temperature is at or exceeds the boiling point of the salt (e.g., at or approximately 1500° C.). In some cases, black dross can be optionally added to the reaction vessel between the first and second stages. The salt extracted in the second stage can be reused in the first stage of a subsequent treatment.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

As used below, any reference to a series of examples is to be understood as a reference to each of those examples disjunctively (e.g., "Examples 1-4" is to be understood as "Examples 1, 2, 3, or 4").

Example 1 is a method for pre-treating dross, comprising: receiving dross pieces; disintegrating the dross pieces into dross particles at or below 10 mm in diameter; agglomerating the dross particles into pellets, wherein the pellets comprise channels when heated to temperatures at or above 800° C. In some cases, the pellets comprise channels when heated to temperatures at or above 500° C.

Example 2 is the method of example(s) 1, further comprising: mixing the dross particles with an additive, wherein the additive is selected to oxidize or otherwise decompose at temperatures at or below 800° C., and wherein oxidization or decomposition of the additive facilitates exposing the channels of the pellets.

Example 3 is the method of example(s) 2, wherein the additive comprises post-consumer scrap or waste materials from other industries.

Example 4 is the method of example(s) 1-3, further comprising extracting metallic aluminum from the dross particles using an eddy current separator prior to agglomerating the dross particles.

Example 5 is the method of example(s) 1-4, further comprising screening the dross particles prior to agglomerating the dross particles, wherein screening comprises removing oversized dross particles.

Example 6 is the method of example(s) 5, wherein removing oversized dross particles comprises directing the oversized dross particles to be further disintegrated.

Example 7 is the method of example(s) 5, wherein removing oversized dross particles comprises directing the oversized dross particles to thermal processing.

Example 8 is the method of example(s) 1-7, further comprising: mixing the dross particles with a fuel additive, wherein the fuel additive is selected to facilitate fueling a dross treatment reaction.

Example 9 is the method of example(s) 1-8, wherein each of the pellets has an average diameter within the range of 5 mm to 50 mm.

Example 10 is the method of example(s) 1-9, wherein the dross pieces comprise aluminum oxides and salt.

Example 11 is a method of treating metal recycling byproduct, comprising: providing dross pellets, wherein each of the dross pellets comprises dross and an additive selected to oxidize or decompose at a channel exposure temperature of at or below 800° C., and wherein the additive is positioned within the pellet to reveal channels in the pellet upon oxidation; heating the dross pellets to a temperature at or above the channel exposure temperature, oxidizing or decomposing the additive to expose the channels of each pellet, wherein the channels of a pellet permit gas to enter and pass through the pellet; maintaining the dross pellets at the temperature to perform thermal processing of the dross pellets. In some cases, heating the dross pellets can be to a temperature at or below 500° C. or at or below 800° C.

Example 12 is the method of example(s) 11, wherein performing thermal processing comprises evaporating salt from the dross pellets.

Example 13 is the method of example(s) 11 or 12, wherein the additive comprises post-consumer scrap or waste materials from other industries.

Example 14 is the method of example(s) 11-13, wherein the dross pellets further comprise a fuel additive selected to facilitate fueling the thermal processing.

Example 15 is the method of example(s) 11-14, wherein each of the dross pellets has an average diameter within the range of 5 mm to 50 mm.

Example 16 is the method of example(s) 11-15, further comprising removing treated dross pellets after performing thermal processing of the dross pellets, wherein the treated dross pellets have a carbon content that is at or less than 1% by weight.

Example 17 is a reconstituted metal recycling byproduct, comprising dross, wherein the dross comprises aluminum oxides; and additive selected to oxidize or decompose at temperature at or below 800° C.; wherein the dross and the additive are agglomerated together into a pellet and wherein the additive is located within the pellet such that one or more channels through the pellet are exposed upon oxidation of the additive.

Example 18 is the reconstituted metal recycling byproduct of example(s) 17, wherein the additive comprises post-consumer scrap or waste materials from other industries.

Example 19 is the reconstituted metal recycling byproduct of example(s) 17 or 18, wherein the dross of the pellet comprises agglomerated dross particles each having an average diameter at or below 10 mm.

Example 20 is the reconstituted metal recycling byproduct of example(s) 17-19, further comprising a fuel additive, wherein the fuel additive is selected to facilitate fueling a dross treatment reaction.

Example 21 is the reconstituted metal recycling byproduct of example(s) 17-20, wherein each of the pellets has an average diameter within the range of 5 mm to 50 mm.

Example 22 is the reconstituted metal recycling byproduct of example(s) 17-21, wherein the dross further comprises salt.

Example 23 is a method of extracting salt from metal recycling byproduct, comprising: charging a vessel with dross comprising aluminum oxides and salt; heating the dross to a temperature sufficiently high to evaporate the salt; maintaining the dross at the temperature to permit evaporation of the salt as salt vapor; directing the salt vapor out of the vessel through a gas outlet; and capturing the salt vapor.

Example 24 is the method of example(s) 23, wherein capturing the salt vapor comprises condensing the salt vapor into solid or liquid salt.

Example 25 is the method of example(s) 23 or 24, wherein the salt comprises NaCl and the temperature is at or above approximately 1450° C.

Example 26 is the method of example(s) 23-25, wherein the salt comprises KCl and the temperature is at or above approximately 1416° C.

Example 27 is the method of example(s) 23-26, wherein the dross comprises compounds selected from the group consisting of nitrides, carbides, sulfides, and phosphides; and wherein maintaining the dross at the temperature further comprises maintaining the dross at the temperature in an oxidizing environment.

Example 28 is the method of example(s) 23-27, wherein the dross comprises residual carbon, and wherein heating the dross to the temperature comprises oxidizing the residual carbon.

Example 29 is the method of example(s) 23-28, wherein the dross comprises residual metallic aluminum, and wherein heating the dross to the temperature comprises oxidizing the residual metallic aluminum.

Example 30 is the method of example(s) 23-29, wherein maintaining the dross at the temperature comprises maintaining the dross at the temperature until at least 95% of the salt has evaporated.

Example 31 is the method of example(s) 23-30, further comprising: removing treated dross from the vessel, wherein the vessel contains residual heat after removing the treated dross; and charging the vessel with additional dross and treating the additional dross, wherein treating the additional dross comprises using the residual heat in the vessel.

Example 32 is the method of example(s) 23-31, wherein maintaining the dross at the temperature to permit evaporation of the salt further comprises detecting a concentration of the salt vapor exiting the gas outlet and determining to stop maintaining the dross at the temperature based on the detected concentration of the salt vapor.

Example 33 is the method of example(s) 32, wherein detecting the concentration of the salt vapor comprises detecting an opacity of the salt vapor existing the gas outlet.

Example 34 is a system for extracting salt from metal recycling byproducts, comprising: a vessel for receiving dross comprising aluminum oxides and salt; a heat source coupled to the vessel for heating the dross to a temperature sufficiently high to evaporate the salt as salt vapor; a gas outlet coupled to the vessel for conveying gas and salt vapor from the vessel; and a salt collector coupled to the gas outlet for collecting and condensing the salt vapor.

Example 35 is the system of example(s) 34, wherein the salt comprises NaCl and wherein the heat source is suitable for heating the dross to temperatures at or above approximately 1450° C.

Example 36 is the system of example(s) 34 or 35, wherein the salt comprises KCl and wherein the heat source is suitable for heating the dross to temperatures at or above approximately 1416° C. In some cases, the salt comprises both KCl and NaCl.

Example 37 is the system of example(s) 34-36, wherein the vessel contains an oxygen inlet for establishing an oxidizing environment; and wherein the dross comprises compounds selected from the group consisting of nitrides, carbides, sulfides, and phosphides.

Example 38 is the system of example(s) 34-37, wherein the vessel contains an oxygen inlet for establishing an oxidizing environment; wherein the dross comprises residual carbon; and wherein the oxidizing environment is suitable for oxidizing the residual carbon to facilitate heating the dross to the temperature.

Example 39 is the system of example(s) 34-38, wherein the vessel contains an oxygen inlet for establishing an oxidizing environment; wherein the dross comprises residual metallic aluminum; and wherein the oxidizing environment is suitable for oxidizing the residual metallic aluminum to facilitate heating the dross to the temperature.

Example 40 is the system of example(s) 33-39, further comprising a sensor for detecting a concentration of salt vapor exiting the gas outlet.

Example 41 is the system of example(s) 40, wherein the sensor comprises an optical sensor for detecting an opacity of the salt vapor exiting the gas outlet.

Example 42 is the system of example(s) 34-41, wherein the heat source comprises an oxy-fuel burner.

Example 43 is a method of processing metal recycling byproduct, comprising: charging a vessel with white dross comprising aluminum oxides; introducing salt to the vessel; contacting the white dross with the salt at a first temperature to facilitate extraction of metal from the white dross and generation of salt cake; heating the salt cake to a second temperature sufficiently high to evaporate the salt, wherein the first temperature is lower than the second temperature; maintaining the salt cake at the second temperature to permit evaporation of the salt as salt vapor, wherein evaporation of the salt from the salt cake results in inert oxides; discharging the inert oxides; collecting the salt vapor and condensing the salt vapor into salt; and reusing the salt to generate subsequent salt cake by contacting the reused salt with subsequent white dross.

Example 44 is the method of example(s) 43, wherein contacting the white dross with the salt at the first temperature and heating the salt cake to the second temperature occurs in the vessel.

Example 45 is the method of example(s) 44, wherein the vessel contains residual heat after discharging the inert oxides and wherein generating the subsequent salt cake comprises using the residual heat in the vessel.

Example 46 is the method of example(s) 43-45, wherein the salt comprises NaCl and the second temperature is at or above approximately 1450° C.

Example 47 is the method of example(s) 43-46, wherein the salt comprises KCl and the second temperature is at or above approximately 1416° C.

Example 48 is the method of example(s) 43-47, wherein the white dross comprises compounds selected from the group consisting of nitrides, carbides, sulfides, and phosphides; and wherein maintaining the salt cake at the second temperature further comprises maintaining the salt cake at the second temperature in an oxidizing environment.

Example 49 is the method of example(s) 43-48, wherein the salt cake comprises residual metallic aluminum, and wherein heating the salt cake to the second temperature comprises oxidizing the residual metallic aluminum.

Example 50 is the method of example(s) 43-49, wherein maintaining the salt cake at the second temperature comprises maintaining the salt cake at the second temperature until at least 95% of the salt has evaporated.

Example 51 is the method of example(s) 43-50, wherein maintaining the salt cake at the second temperature to permit evaporation of the salt further comprises detecting a concentration of the salt vapor exiting the vessel and determining to stop maintaining the salt cake at the second temperature based on the detected concentration of the salt vapor.

Example 52 is the method of example(s) 51, wherein detecting the concentration of the salt vapor comprises detecting an opacity of the salt vapor.

Example 53 is the method of example(s) 43-51, further comprising reusing at least a portion of the reused salt for a use other than generating subsequent salt cake.

Example 54 is the method of example(s) 53, wherein the use other than generating subsequent salt cake comprises using the salt to facilitate melting of scrap metal.

What is claimed is:

1. A system for extracting salt from metal recycling byproducts, comprising:
- a vessel for receiving dross comprising aluminum oxides and salt;
- a heat source coupled to the vessel for heating the dross to a temperature sufficiently high to evaporate the salt as salt vapor;
- a gas outlet coupled to the vessel for conveying gas and salt vapor from the vessel; and
- a salt collector coupled to the gas outlet for collecting and condensing the salt vapor, wherein the salt collector is coupled to a salt source to replenish the salt source through the extraction of salt from the dross within the vessel, wherein the salt source provides salt to the vessel.

2. The system of claim 1, wherein the salt comprises NaCl and wherein the heat source is suitable for heating the dross to temperatures at or above 1450° C.

3. The system of claim 1, wherein the salt comprises KCl and wherein the heat source is suitable for heating the dross to temperatures at or above 1416° C.

4. The system of claim 1, wherein the vessel contains an oxygen inlet for establishing an oxidizing environment; and wherein the dross comprises compounds selected from the group consisting of nitrides, carbides, sulfides, and phosphides.

5. The system of claim 1, wherein the vessel contains an oxygen inlet for establishing an oxidizing environment; wherein the dross comprises residual carbon; and wherein the oxidizing environment is suitable for oxidizing the residual carbon to facilitate heating the dross to the temperature.

6. The system of claim 1, wherein the vessel contains an oxygen inlet for establishing an oxidizing environment; wherein the dross comprises residual metallic aluminum; and wherein the oxidizing environment is suitable for oxidizing the residual metallic aluminum to facilitate heating the dross to the temperature.

7. The system of claim 1, further comprising a sensor for detecting a concentration of salt vapor exiting the gas outlet.

8. The system of claim 7, wherein the sensor comprises an optical sensor for detecting an opacity of the salt vapor exiting the gas outlet.

9. The system of claim 1, wherein the heat source comprises an oxy-fuel burner.

10. A method of extracting salt from metal recycling byproduct using the system of claim 1, comprising:

- charging the vessel with dross comprising aluminum oxides and salt;
- heating the dross to a temperature to evaporate the salt;
- maintaining the dross at the temperature to permit evaporation of the salt as salt vapor;
- directing the salt vapor out of the vessel through the gas outlet;
- collecting and condensing the salt vapor into salt; and
- collecting the salt and replenishing the salt source, wherein the salt source provides the salt to the vessel.

11. The method of claim 10, wherein capturing the salt vapor comprises condensing the salt vapor into solid or liquid salt.

12. The method of claim 10, wherein the salt comprises NaCl and the temperature is at or above 1450° C.

13. The method of claim 10, wherein the salt comprises KCl and the temperature is at or above 1416° C.

14. The method of claim 10, wherein the dross comprises compounds selected from the group consisting of nitrides, carbides, sulfides, and phosphides; and wherein maintaining the dross at the temperature further comprises maintaining the dross at the temperature in an oxidizing environment.

15. The method of claim 10, wherein the dross comprises residual carbon, and wherein heating the dross to the temperature comprises oxidizing the residual carbon.

16. The method of claim 10, wherein the dross comprises residual metallic aluminum, and wherein heating the dross to the temperature comprises oxidizing the residual metallic aluminum.

17. The method of claim 10, wherein maintaining the dross at the temperature comprises maintaining the dross at the temperature until at least 95% of the salt has evaporated.

18. The method of claim 10, further comprising:

- removing treated dross from the vessel, wherein the vessel contains residual heat after removing the treated dross; and
- charging the vessel with additional dross and treating the additional dross, wherein treating the additional dross comprises using the residual heat in the vessel.

19. The method of claim 10, wherein maintaining the dross at the temperature to permit evaporation of the salt further comprises detecting a concentration of the salt vapor exiting the gas outlet and determining to stop maintaining the dross at the temperature based on the detected concentration of the salt vapor.

20. The method of claim 19, wherein detecting the concentration of the salt vapor comprises detecting an opacity of the salt vapor exiting the gas outlet.

* * * * *